United States Patent
Zander et al.

(10) Patent No.: US 12,491,485 B2
(45) Date of Patent: Dec. 9, 2025

(54) REACTOR FOR ENDOTHERMIC HIGH-TEMPERATURE REACTIONS

(71) Applicants: BASF SE, Ludwigshafen am Rhein (DE); thyssenkrupp Industrial Solutions AG, Essen (DE); thyssenkrupp AG, Essen (DE)

(72) Inventors: Hans-Jörg Zander, Munich (DE); Markus Weikl, Egling (DE); Andreas Bode, Mannheim (DE); Dirk Klingler, Mannheim (DE); Matthias Kern, Neustadt an der Weinstrasse (DE); Grigorios Kolios, Neustadt (DE); Achim Wechsung, Mannheim (DE); Frederik Scheiff, Deidesheim (DE); Dieter Flick, Böhl-Iggelheim (DE); Nicolai Antweiler, Essen (DE); Karsten Büker, Dortmund (DE)

(73) Assignees: BASF SE, Ludwigshafen am Rhein (DE); thyssenkrupp AG, Essen (DE); thyssenkrupp Uhde GmbH, Dortmund (DE)

( * ) Notice: Subject to any disclaimer, the term of this patent is extended or adjusted under 35 U.S.C. 154(b) by 0 days.

(21) Appl. No.: 17/594,044

(22) PCT Filed: Mar. 31, 2020

(86) PCT No.: PCT/EP2020/025152
§ 371 (c)(1),
(2) Date: Sep. 30, 2021

(87) PCT Pub. No.: WO2020/200522
PCT Pub. Date: Oct. 8, 2020

(65) Prior Publication Data
US 2022/0152568 A1    May 19, 2022

(30) Foreign Application Priority Data
Apr. 5, 2019    (DE) .................. 10 2019 002 523.7

(51) Int. Cl.
*B01J 8/12*    (2006.01)
*B01J 8/08*    (2006.01)
(Continued)

(52) U.S. Cl.
CPC .............. *B01J 8/12* (2013.01); *B01J 8/087* (2013.01); *B01J 8/125* (2013.01); *C01B 3/28* (2013.01);
(Continued)

(58) Field of Classification Search
None
See application file for complete search history.

(56) References Cited

U.S. PATENT DOCUMENTS 1,129,512 A * 2/1915 Peacock .................. F27D 11/02
48/65
1,400,959 A * 12/1921 Koetschet .............. B01J 8/0285
204/170
(Continued)

FOREIGN PATENT DOCUMENTS

CN    108779404 A    11/2018
DE    4035840 C1 *    4/1992
(Continued)

*Primary Examiner* — Jennifer A Leung
(74) *Attorney, Agent, or Firm* — Grüneberg and Myers PLLC (57) ABSTRACT

A reactor for carrying out an endothermic reaction, in particular a high-temperature reaction, in which a product gas is obtained from a feed gas, wherein: the reactor surrounds a reactor interior; the reactor is configured to provide a reactor bed in a reaction zone of the reactor interior, which reactor bed comprises a large number of solid material particles; the reactor is also configured to guide the (Continued)

feed gas into the reaction zone; in order to heat the feed gas, the reactor is designed to heat the solid material particles in the reaction zone such that, by transferring heat from the solid material particles to the feed gas, the feed gas in the reaction zone can be heated to a reaction temperature in order to participate as a starting product in the endothermic reaction for producing the product gas.

15 Claims, 3 Drawing Sheets (51) Int. Cl.
   *C01B 3/28* (2006.01)
   *C01B 3/42* (2006.01)
   *C01B 3/18* (2006.01)

(52) U.S. Cl.
   CPC ....... *C01B 3/42* (2013.01); *B01J 2208/00398* (2013.01); *B01J 2208/0053* (2013.01); *B01J 2219/0809* (2013.01); *B01J 2219/1946* (2013.01); *C01B 3/18* (2013.01); *C01B 2203/085* (2013.01)

(56) References Cited

U.S. PATENT DOCUMENTS

| | | | | |
|---|---|---|---|---|
| 1,671,673 | A * | 5/1928 | Doerschuk | C10L 9/08 201/36 |
| 2,161,916 | A * | 6/1939 | Erdmann | H05B 3/60 266/192 |
| 2,348,156 | A * | 5/1944 | Sheppard | C10G 11/16 422/216 |
| 2,519,340 | A * | 8/1950 | Bailey | C10B 49/18 48/210 |
| 2,736,686 | A * | 2/1956 | Weber | C10G 9/30 585/602 |
| 2,745,932 | A * | 5/1956 | Glaser | H05B 3/148 338/262 |
| 2,799,640 | A * | 7/1957 | Pevere | B01J 19/088 422/186.21 |
| 2,982,622 | A | 5/1961 | Jahnig et al. | |
| 3,695,864 | A * | 10/1972 | Cooper | C22B 26/10 75/10.29 |
| 4,229,419 | A * | 10/1980 | Haese | B01J 8/062 422/208 |
| 4,357,210 | A * | 11/1982 | Aubry | C10L 9/08 201/34 |
| 5,946,342 | A * | 8/1999 | Koslow | C01B 32/39 373/120 |
| 6,372,018 | B1 * | 4/2002 | Cowles | B01D 53/0454 95/143 |
| 11,078,077 | B2 | 8/2021 | Maass et al. | |
| 2007/0032616 | A1 | 2/2007 | Weickert | |
| 2010/0280271 | A1 | 11/2010 | Sommer et al. | |
| 2021/0051770 | A1 * | 2/2021 | Appel | B01J 8/24 |
| 2022/0063996 | A1 * | 3/2022 | Antweiler | B01J 6/008 |

FOREIGN PATENT DOCUMENTS

| | | | |
|---|---|---|---|
| DE | 102009004750 A1 | 9/2010 | |
| EP | 1775244 A1 * | 4/2007 | ......... B65G 53/4633 |
| GB | 1026055 A * | 4/1966 | |
| JP | S46-31961 Y1 | 11/1971 | |
| JP | 2010-260858 A | 11/2010 | |

\* cited by examiner

REACTOR FOR ENDOTHERMIC HIGH-TEMPERATURE REACTIONS

This application is the result of a joint research agreement amongst BASF SE, hte AG, Linde AG, ThyssenKrupp Steel Europe AG, ThyssenKrupp Uhde GmbH, Technische Universität Dortmund, and VDEh-Betriebsforschungsinstitut GmbH.

The invention relates to a reactor for endothermic high-temperature reactions, for example, for carrying out steam reformation of a hydrocarbon-containing feed gas stream (e.g., comprising methane) or, for example, for the cracking or thermal cracking of ethane or, for example, for the pyrolysis of natural gas (e.g., comprising methane).

Fossil fuels are combusted in furnaces or reactors for ethane cracking or the steam reformation of methane in order to produce thermal energy, for example, in order to heat the respective feed flow or process gases by means of indirect heat transfer. $CO_2$ emissions are inevitably produced by the combustion of fossil fuels. The energy efficiency is generally increased by preheating combustion air, preheating the feed, and/or by transferring heat of a hot process gas to boiler feed water to produce process steam.

As an alternative to the established prior art, U.S. Pat. No. 2,982,622 discloses, for example, a method for producing hydrogen and high-quality coke in which inert solid material particles are passed as bulk material through an elongated reaction zone in a gravitational direction, an electrical voltage of 0.1 to 1000 volts per inch is applied across at least a portion of the solid material mass in the reaction zone, wherein the voltage is sufficient to increase the temperature of the solids to 1800° F. to 3000° F. (980° C. to 1650° C.). A gas stream of hydrocarbons, preferably natural gas, is guided in the counterflow, which gas stream produces hydrogen via the endothermic pyrolysis reaction and deposits carbon onto the introduced particles $$CH_4 <\text{->} C(s) + 2H_2.$$

Heat integration can be achieved by the counterflow condition of solid and gas facilitating high method efficiency. When current generated with the aid of renewable energies is used, the $CO_2$ balance of the hydrogen production method can be improved by dispensing with fossil heating by means of ohmic, direct electrical heating.

In this respect, however, it was found on the basis of investigations that the carbon separated from the gas phase leads to a reduction in the pourability of the inert solid material particles and, after prolonged operation, leads to a blocking of the bulk material, which significantly limits the economic efficiency of such a process.

Starting therefrom, the object of the present invention is to provide an improved reactor which dispenses with fossil heating of the endothermic reaction and at the same time allows efficient operation of the reactor.

The object is achieved by a reactor having the features described herein. Advantageous embodiments of the invention are specified in the associated dependent claims and are described below.

Reactor for carrying out an endothermic reaction, in particular a high-temperature reaction, in which a product gas is obtained from a feed gas, wherein the reactor surrounds a reactor interior which is preferably divided into three zones, namely a first heat integration zone, a reaction zone and a second heat integration zone. The reactor is configured to guide a moving bed in the gravitational direction, wherein the moving bed consists of a plurality of solid material particles which are added at the upper end of the reactor and withdrawn at the lower end of the reactor, wherein the reactor is further configured to guide a feed gas through the reaction zone, wherein the reactor for heating the feed gas is configured to heat the solid material particles in the reaction zone (for example, by generating an electric current in the solid material particles, i.e., by generating Joule heat in the solid material particles) such that, by transferring heat from the solid material particles to the feed gas, the feed gas in the reaction zone may be heated to a reaction temperature in order to participate as a starting product in the endothermic reaction for producing the product gas, and wherein the reactor interior also comprises a first heat integration zone in which heat from the product gas produced in the reaction zone can be transferred to solid material particles of the reactor bed which are to be guided into the reaction zone, and wherein the interior also comprises a second heat integration zone in which heat from solid material particles of the reactor bed coming from the reaction zone can be transferred to the feed gas in order to preheat the feed gas.

According to one embodiment of the reactor, it is provided that the reactor for heating the solid material particles of the moving bed comprises a first and a second electrode, wherein in particular the first electrode is arranged above the second electrode in the interior, and wherein in particular the two electrodes are each permeable to the solid material particles, the feed gas and the product gas. That is to say that the two electrodes are arranged or configured in such a way that the flowability of the solid material particles is not impaired and the solid material particles, the feed gas and the product gas can pass through the electrodes in the reactor interior.

According to one embodiment of the reactor, the first and/or the second electrode may comprise one or more struts extending through the reactor interior.

Furthermore, according to one embodiment, it is provided that the first electrode comprises a grid or is formed by a grid. Furthermore, the second electrode may also comprise a grid or be formed by a grid.

Furthermore, one embodiment of the invention provides that the first and/or the second electrode (or the respective strut or the grid of the first and/or the second electrode) comprises one of the following materials or consists of one of the following materials: a high-temperature-resistant steel, a steel alloy comprising Ni (e.g., Centralloy G 4852 Micro R), a nickel-based alloy, silicon carbide, molybdenum disilicide, graphite.

In principle, materials are preferred that are characterized by high-temperature resistance (chemical and mechanical stability at high temperatures) and as high an electrical conductivity as possible. In the case of graphite, chemical stability in the presence of steam and high temperatures can be improved, for example, by a protective coating.

One embodiment also provides that the electrodes, an electrical supply to the electrodes, and the moving bed are electrically insulated toward the pressure jacket of the reactor. This is achieved, for example, by an electrically slightly conductive high-temperature lining, for example made of $Al_2O_3$ or $ZrO_2$.

Furthermore, one embodiment of the invention provides that the reactor is configured to provide or apply a direct voltage between the two electrodes in order to heat the solid material particles.

One embodiment of the reactor furthermore provides that the reactor has a solid material particle inlet via which solid material particles can be introduced into the first heat integration zone so that the solid material particles can be guided past the first electrode into the reaction zone and also guided past the second electrode into the second heat integration zone.

One embodiment of the reactor furthermore provides that the reactor has a solid material particle outlet via which the solid material particles can be withdrawn from the second heat integration zone, for example a cellular wheel sluice. This is the decisive control element for the speed of travel or the mass flow of the moving bed.

One embodiment of the reactor furthermore provides that the reactor comprises a feed gas inlet via which the feed gas can be introduced into the second heat integration zone and from there can be introduced, past the second electrode, into the reaction zone.

One embodiment of the reactor furthermore provides that the reactor has a product gas outlet via which product gas produced in the reaction zone can be withdrawn from the first heat integration zone.

One embodiment of the reactor furthermore provides that the reactor is configured to guide the solid material particles in the first and/or the second heat integration zone, driven by gravity, in the form of a moving bed.

According to a further embodiment of the reactor, it is provided that the reactor is configured to guide the solid material particles in the reaction zone, driven by gravity, in the form of a moving bed.

One embodiment of the reactor furthermore provides that the reaction zone of the reactor is delimited by a circumferential wall section of the reactor comprising an inner side facing the reaction zone, which inner side is of conical design such that the reaction zone tapers upward in a vertical direction. According to one embodiment, the inner side can form an angle with a horizontal cross-section of the reaction zone, wherein the angle is preferably in a range of from 85° to 89.5°, preferably 87° to 89°.

A further aspect of the present invention relates to a method for carrying out an endothermic reaction for obtaining a product gas from a feed gas using a reactor according to the invention, wherein a plurality of solid material particles is guided into the first heat integration zone and from there into the reaction zone, the solid material particles are heated in the reaction zone, the solid material particles are guided from the reaction zone into the second heat integration zone and are withdrawn from the second heat integration zone, the feed gas is introduced into the second heat integration zone and from there into the reaction zone, wherein the feed gas in the second heat integration zone is heated against solid material particles coming from the reaction zone, wherein the solid material particles are cooled, and wherein the feed gas in the reaction zone is in contact with the heated solid material particles, wherein heat from the heated solid material particles is transferred to the feed gas in order to heat the feed gas in the reaction zone, wherein the feed gas in the reaction zone participates as a starting product in the reaction by producing the product gas, the product gas produced is guided from the reaction zone into the first heat integration zone, wherein the solid material particles in the first heat integration zone are preheated against the product gas coming from the reaction zone, wherein the product gas is cooled, and wherein the product gas is withdrawn from the first heat integration zone.

In the method according to one embodiment, the solid material particles are preferably recirculated. That is to say, in particular, that the solid material particles withdrawn from the second heat integration zone (possibly after an intermediate treatment of the solid material particles) are returned to the first heat integration zone.

According to a further embodiment of the method, the feed gas is ethane ($C_2H_6$) together with steam ($H_2O$), which feed gas is converted in the reaction zone into ethene ($C_2H_4$) and hydrogen ($H_2$) as product gas at preferably at temperatures of about 850° C. to 1250° C. and pressures of 1-5 bar(a), wherein ceramic spheres, for example made of corundum ($Al_2O_3$), are used as solid material particles.

According to a further embodiment of the method, the endothermic reaction is steam reforming:

$$CH_4+H_2O \rightarrow CO+3H_2,$$

wherein as feed gas methane ($CH_4$) is reacted together with steam ($H_2O$) in the reaction zone (preferably at temperatures of about 950° C. to 1250° C. and pressures of 10 bar(a) to 100 bar(a) (preferably at pressures of 15 bar(a) to 50 bar(a)) to form carbon monoxide and hydrogen as product gas, wherein ceramic spheres, for example made of corundum ($Al_2O_3$), are again preferably used as solid material particles, or alternatively an abrasion-resistant Ni-based catalyst.

Furthermore, the reaction according to one embodiment may also be a reverse water gas shift reaction:

$$CO_2+H_2 \rightarrow CO+H_2O,$$

in which $CO_2$ and $H_2$ as feed are reacted to form CO and $H_2O$, wherein ceramic spheres, for example made of corundum ($Al_2O_3$), are again used as solid material particles, or alternatively an abrasion-resistant Ni-based catalyst.

In principle, the reaction may also be a steam cracking, wherein the naphtha is used as feed.

Furthermore, the reaction according to one embodiment may be a propane dehydration to form propene ($C_3H_8 \rightarrow C_3H_6+H_2$), wherein propane is used as feed and the solid material particles of the reactor bed form a catalyst suitable for the reaction. The catalyst requires increased abrasion resistance compared to a tube-fixed-bed reactor, but may advantageously be subjected to an external catalyst regeneration if coking occurs due to the reaction.

Furthermore, according to one embodiment, the reaction may also be a butane dehydration to form butene ($C_4H_{10} \rightarrow C_4H_8+H_2$), wherein butane is used as feed and the solid material particles of the reactor bed again form a catalyst suitable for the reaction.

Furthermore, the reaction according to one embodiment may also be a butene dehydration to form butadiene ($C_4H_8 \rightarrow C_4H_6+H_2$), wherein butene is used as feed and the solid material particles of the reactor bed again form a catalyst suitable for the reaction.

Furthermore, the reaction according to one embodiment may also be an ethylbenzene dehydration to form styrene ($C_8H_{10} \rightarrow C_8H_8+H_2$), wherein ethylbenzene is used as feed and the solid material particles of the reactor bed again form a catalyst suitable for the reaction.

Further features and advantages of the present invention will be explained in the description of exemplary embodiments, with reference to the figures. The figures show.

Figure 1:
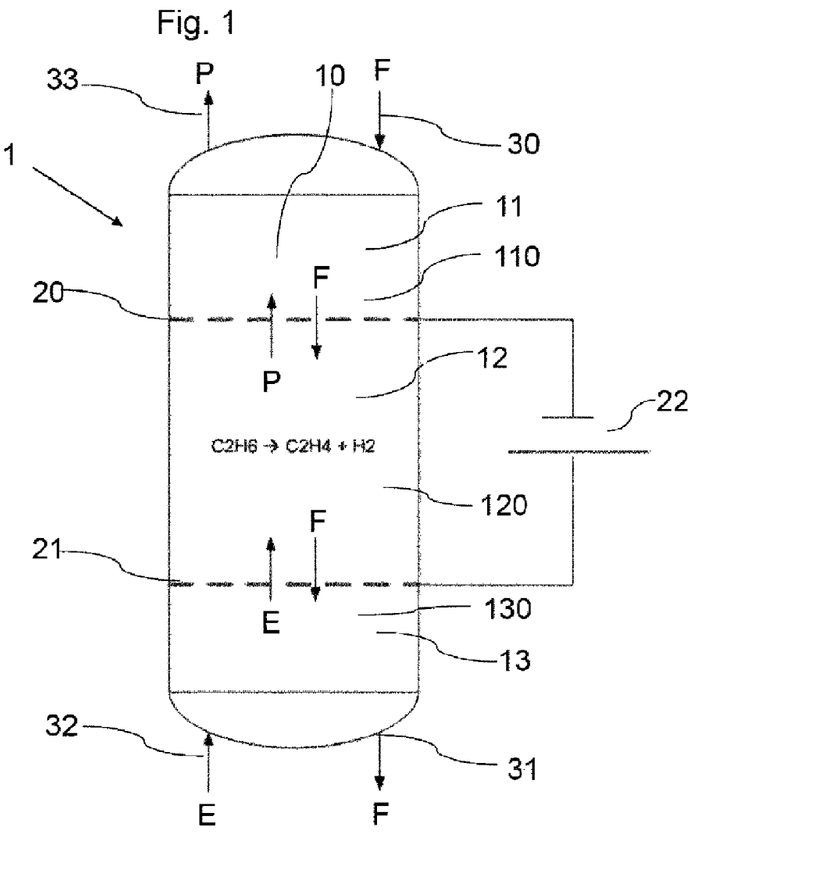
FIG. 1 a schematic representation of an embodiment of a reactor according to the invention or of a method according to the invention.
Figure 2:
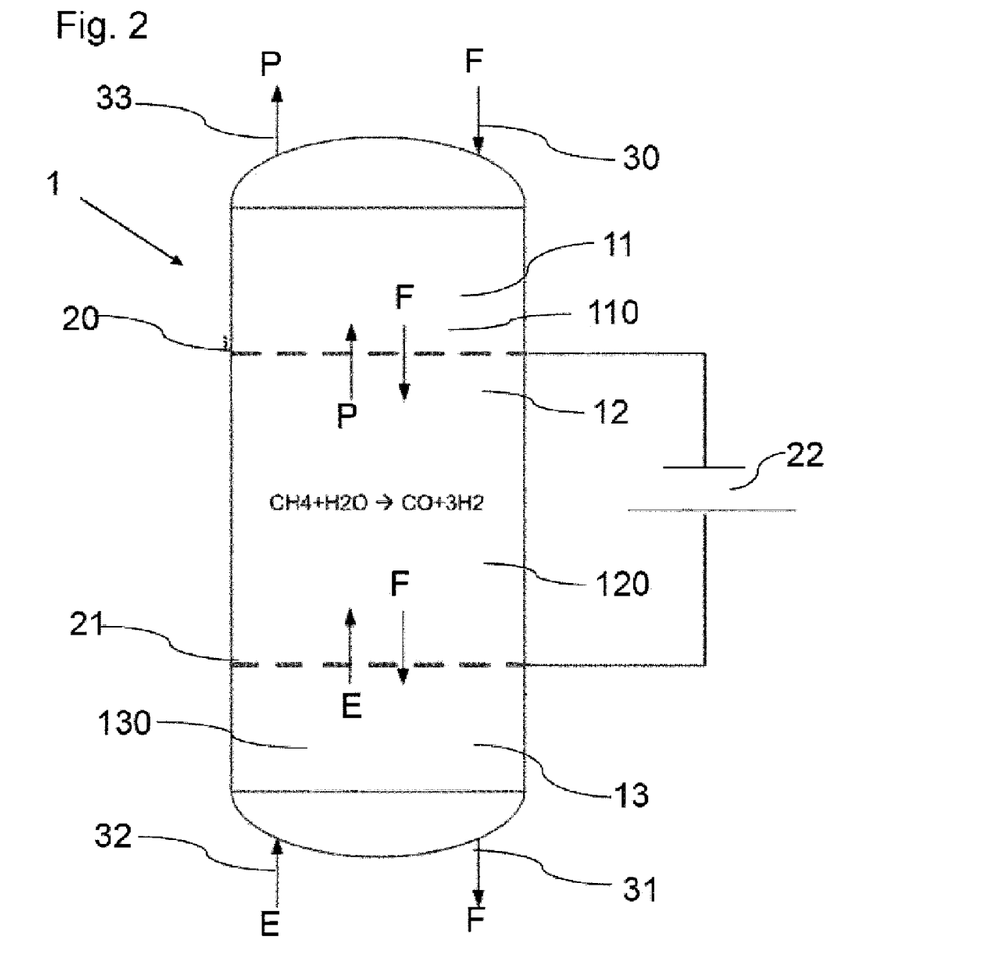
FIG. 2 a schematic representation of a further embodiment of a method according to the invention.
Figure 3:
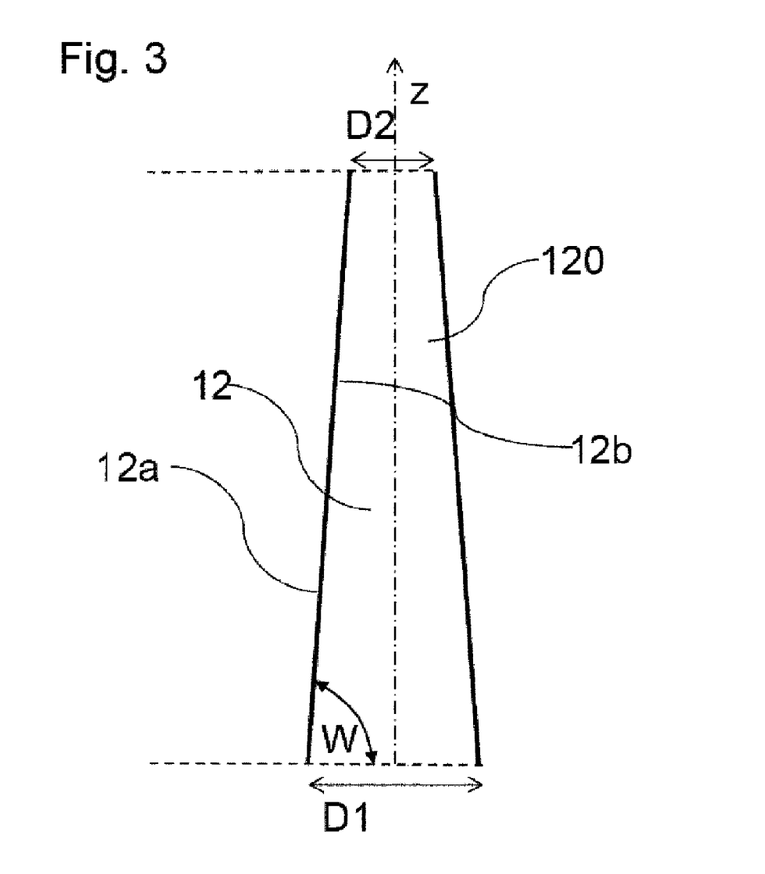
FIG. 3 a schematic representation of an embodiment of a reaction zone of a reactor according to the invention or of a method according to the invention.

The present invention relates to a reactor 1 for carrying out an endothermic reaction, as shown in FIGS. 1 to 3 in different embodiments or applications.

The reactor 1 is configured to carry out an endothermic reaction in which a product gas P is obtained from a feed gas E. In this respect, FIG. 1 shows a variant in which ethane as feed gas E is reacted to form ethene ($C_2H_4$) and hydrogen ($H_2$) as product gas P. Alternatively, according to FIG. 2, the reactor may also be used, for example, for steam reforming, wherein as feed gas methane ($CH_4$) together with steam ($H_2O$) is reacted to form carbon monoxide and hydrogen as product gas P or synthesis gas. Other reactions are also conceivable.

According to FIGS. 1 to 3, the reactor 1 respectively surrounds a reactor interior 10, wherein the reactor 1 is configured to provide a reactor bed 120 comprising a plurality of solid material particles F in a reaction zone 12 of the reactor interior 10, wherein the reactor 1 is furthermore configured to guide the feed gas E into the reaction zone 12, wherein the reactor 1 for heating the feed gas E is configured to heat the solid material particles F in the reaction zone 12 so that the feed gas E in the reaction zone 12 can be heated to a reaction temperature by transferring heat from the solid material particles F to the feed gas E in order to participate as a starting product in the respective endothermic reaction for producing the product gas P, and wherein the reactor interior 10 also comprises a first heat integration zone 11 in which heat from the product gas P produced in the reaction zone 12 can be transferred to solid material particles F of the reactor bed 120 to be guided into the reaction zone 12, and wherein the reactor interior 10 also comprises a second heat integration zone 13 in which heat from solid material particles F of the reactor bed 120 coming from the reaction zone 12 can be transferred to the feed gas E in order to preheat the feed gas E.

In the embodiments of the reactor 1 shown in FIGS. 1 and 2, the reactor bed 120 in the reaction zone 12 and the reactor beds 110, 130 in the heat integration zones are solid material particles F driven by gravity, wherein the feed gas E forms a counterflow gas flow so that preferably almost complete heat integration can be achieved.

According to one embodiment, the heating and cooling of gases takes place on a time scale of 0.1 s to 1 s, which is advantageous for the reaction control if, for example, rapid cooling to a lower temperature of the product gas is required.

As can be seen with reference to FIGS. 1 and 2, a direct electrical (or inductive) heating of the solid material particles F is used to heat the feed gas E. Correspondingly permeable electrodes 20, 21, in particular in the form of grids 20, 21, may be used for this purpose, wherein an electrical voltage 22 is applied to the electrodes 20, 21 and thus the resistance of the solid material particles F (primarily solid state to solid state contact resistances instead of material resistances) is used for heat production/heat dissipation.

In order to achieve optimal heat integration, according to a preferred embodiment, the heat capacity flows of the gas and solid material particle flows E, P, F are adapted to each other. This leads to so-called heat integration zones 11, 13 in the reactor interior 10 or moving bed, 110, 130, in which heat integration zones 11, 13 the feed gas E is preheated by hot solid material particles F from the reaction zone 12 (lower second heat integration zone 13) and hot product gas P heats cold solid material particles F which are introduced at the upper side of the reactor 1.

According to FIGS. 1 and 2, it is hereby preferably provided that the reaction zone 12 is arranged in the vertical direction between the two electrodes 20, 21 when the reactor 1 is arranged as intended, wherein the first heat integration zone 11 is arranged above the first electrode 20, and wherein the second heat integration zone 21 is arranged below the second electrode.

In order to introduce the solid material particles F forming the respective reactor bed 110, 120, 130, it is furthermore provided that the respective reactor 1 comprises a solid material particle inlet 30 via which solid material particles F can be introduced into the first heat integration zone 11 so that the solid material particles F can be guided past the first electrode 20 into the reaction zone 12 and also guided past the second electrode 21 into the second heat integration zone 13.

In order to withdraw the solid material particles F (and in particular to recirculate the solid material particles F to the solid material particle inlet 30), the reactor 1 also comprises a solid material particle outlet 31 via which the solid material particles F can be withdrawn from the second heat integration zone 13.

Furthermore, in particular, the respective reactor 1 for introducing the feed gas E into the reactor interior 10 comprises a feed gas inlet 32 via which the feed gas E can be introduced into the second heat integration zone 13 and from there can be guided past the second electrode 21 into the reaction zone 12.

In order to withdraw the product gas P, the respective reactor 1 finally comprises a product gas outlet 33 via which product gas P produced in the reaction zone 12 can be withdrawn from the first heat integration zone 11.

According to one example of the invention, at least 90% of the heat used can be recovered according to FIG. 1 during the production of ethylene, wherein solid material particles F consisting of carbon are assumed for the calculation. However, ceramic materials are preferably used instead of carbon. In particular, solid material particles F consisting of, for example, $Al_2O_3$ may be used in the present invention as a component of the reactor bed.

In order to achieve the aforementioned heat recovery, the feed gas (ethane) E having a temperature of, for example, 150° C. and a pressure of, for example, 2 bar at a mass flow rate of, for example, 1000 kg/h, can be introduced into the reactor 1. The feed gas E may be diluted with steam, which has a temperature of, for example, 155° C. at a pressure of, for example, 2 bar and a mass flow of, for example, 300 kg/h. The reaction of ethane to form ethylene may be carried out in the reaction zone at a temperature of, for example, 850° C., wherein the ethylene product may be withdrawn from the reactor 1, for example, at a temperature of 150° C. at a pressure of, for example, 2 bar and a mass flow rate of, for example, 606 kg/h. The solid material particles F may also be fed into the reactor 1 at a temperature of, for example, 174° C. and a pressure of, for example, 2 bar and a mass flow rate of 2.9 t/h and be withdrawn from the reactor 1 at a temperature of 280° C.

With a given conversion of 65% of the feed of ethane to form ethylene (with the feed being steam diluted with 30% steam), the heating power is 1550 kWh/t ethylene product. With a 90% conversion efficiency of electrical energy, the electrical consumption is 1722 kWh/t ethylene product.

In a similar way to the ethane cracking, the reactor 1 according to the invention or the method according to the invention according to FIG. 2 may also be used for steam methane reforming. Instead of inert particles, a catalyst may also be used as a solid medium or solid material particles F in the moving bed 110, 120, 130. The catalyst requires increased abrasion resistance compared to a tube-fixed-bed reactor, but can advantageously be subjected to external catalyst regeneration. The decision as to whether inert particles or the reaction-influencing particles are to be used can be made in particular on the basis of the reaction temperature. Using the example of steam reforming, a catalyst material may be used in the lower temperature range (at approximately 950° C.), for example, while in the upper temperature range (at approximately 1250° C.) the reactions take place sufficiently quickly and an inert material can be used.

According to one embodiment, the reactor is configured to guide the solid material particles through the reaction zone 12 or the heat integration zones 11, 13 at a defined velocity, wherein this velocity of the solid material particles F (e.g. in the embodiments according to FIGS. 1 and 2) is preferably within the range of from 0.1 m/h to 2 m/h, which represents a slow and very material-friendly velocity at which the risk of friction-related damage to the reactor is correspondingly lower.

Direct electrical heating by means of the electrodes 20, 21 at ~800° C. to –1250° C. of a carbon moving bed 120 is possible with electrical resistances in the range of from ~1.0 ohm to 10 ohm. For this purpose, solid material particles F in the form of carbon particles having a specific bed resistance of ~0.005-0.04[ohm*m] can be used, for example, at temperatures in the range above 800° C.

The solid material particles F of the moving bed 110, 120, 130 should be sufficiently chemically stable under the reaction conditions such that ceramic materials are preferred over carbon if steam or larger quantities of $CO_2$ are contained in the educt gas. The respective solid material medium F can be selected depending on the process requirement. In principle, low-impedance materials, e.g., ceramic materials, are advantageous, wherein the electrical conductivity should preferably be higher than that of the fire-resistant lining material of the reactor 1 such that a heating of the reactor bed 120 and not of the surrounding fire-resistant material of the reactor takes place primarily. When materials with relatively high conductivity are used, the transition resistance between the individual solid material particles F is especially significant for the overall resistance. The surface morphology can, therefore, be adjusted in such a way that it requires an increased electrical resistance. According to one embodiment, the solid material particles are, for example, non-spherical particles.

The length of the reaction zone 12 in the vertical direction or in the flow direction of the solid material particles F and of the feed gas stream E defines the dwell time of the gas in the heated zone 12. The greater the length, the more favorable the conditions for electrical heating since a correspondingly high overall electrical resistance ensues (serial contact resistances of the particles F). Dwell times less than 1 s in the reaction zone 12 are possible, which is advantageous for ethylene production by ethane dehydration.

Furthermore, the particle size of the solid material particles F can be selected depending on the reactor requirement. For example, rapid heating is advantageous, in which particle sizes in the range of at most 5 mm for efficient direct heat transfer between the gas phase and the solid phase. Low heating times of 0.1 s to 1 s are thus possible without any problems.

Furthermore, according to one embodiment, a monomodal particle size distribution of the solid material particles F also proves to be advantageous since this leads to homogeneous heating and approximately to a plug flow, without demixing by partial fluidization.

The selection of the electrode material of the electrodes 20, 21 is based in particular on the following criteria, according to which a material that is stable under the reaction conditions (temperature, gas conditions, solid fluidized bed materials) is preferred, which material has a comparatively high electrical conductivity in comparison to the bed medium in order to ensure heating in the bed and not in the electrode, wherein the material should still allow producibility in the form required for the entire electrode. In the simplest case, the respective electrode 20 is configured, for example, as a single or as a plurality of struts, but may also have a more complex grid form. For the aforementioned processes, stainless steels or Ni-based alloys (due to high temperatures) may be considered as electrode material. For example, the material Centralloy® G 4852 Micro R is stable under reformer conditions, has acceptable strength, and may be used as electrode material. If no steam (no steam dilution) or $CO_2$ is present in the feed or product gas E, P, graphite may in principle also be used as electrode material. Alternatively, graphite may be coated with a chemically stable protective layer, which must, however, be electrically conductive.

Furthermore, according to an embodiment shown in FIG. 3, it can be provided that the reaction zone 12 of the reactor 1 is delimited by a circumferential wall section 12a of the reactor 1 which has an inner side 12b facing the reaction zone 12 and is of conical design such that the reaction zone 12 tapers upward in a vertical direction z. The diameter D1 of the reaction zone 12 is thereby reduced to the diameter D2 of the reaction zone 12.

The inner side 12b forms in particular a lateral surface of a truncated cone. In other words, the reaction zone 12 forms in particular a truncated cone in this region.

Such a conically expanding geometry of the reaction zone 12 advantageously leads to a lateral movement of solid material particles F of the moving bed 120 in the reaction zone 12. In the case of carbon deposits from the feed gas onto the solid material particles F, for example in a pyrolysis reaction during the pure methane pyrolysis (steam free) or in the case of coking during steam reforming when using small steam to carbon ratios (also referred to as S/C), for example S/C<1, 8, in particular S/C<1, or in the case of a coking reaction during ethane cracking, bridge formation can occur, which is broken apart again by the lateral movement of the particles F and does not thereby lead to blocking.

The inner side 12b preferably forms an angle W with a horizontal plane or a horizontal cross-section of the reaction zone 12, which can be relatively close to 90°.

The angle W is preferably in a range from 85° to 89.5°, preferably in the range from 87° to 89°.

In principle, the reactor according to the invention may be used for any other endothermic reaction, wherein preferably no increased solids production should take place in the reaction zone 12. In this regard, for example, a blockade of the moving bed 120 and the corresponding change in resistance of the bed proves to be disadvantageous in methane pyrolysis ($CH_4$->$C+2H_2$).

Furthermore, for directly heating the particles F by means of the electrodes 20, 21, an alternating voltage instead of a direct voltage 22 can also be applied to the resistance heater.

The present invention advantageously enables reduced direct emission of $CO_2$ from the process due to the specific heating of the particles F. Furthermore, due to the heat integration between products and starting products in the reactor itself, no or only reduced external equipment is necessary for heat recovery.

The invention allows comparatively short heating and cooling times resulting in good reaction control. This is particularly advantageous since rapid cooling of the gas escaping from the reaction zone during steam cracking is necessary in order to increase the yield of the target product.

Steam production may be advantageously reduced. Furthermore, no de-coking cycles are necessary during ethane cracking, since coke applied to particles can be removed from the process. Thus, the de-coking can advantageously take place outside the reactor, for example by burning off preheated air.

| List of reference signs | |
|---|---|
| 1 | Reactor |
| 10 | Reactor interior |
| 11 | First heat integration zone |
| 12 | Reaction zone |
| 12a | Wall section |
| 12b | Inner side |
| 13 | Second heat integration zone |
| 20 | First electrode |
| 21 | Second electrode |
| 22 | Electrical voltage or voltage source |
| 30 | Solid material particle inlet |
| 31 | Solid material particle outlet |
| 32 | Feed gas inlet |
| 33 | Feed gas outlet |
| 110, 130 | Moving bed |
| 120 | Moving bed |
| 330 | Flow connection |
| F | Solid material particles (reactor bed) |
| E | Feed gas |
| P | Product gas |
| W | Angle |

The invention claimed is:

1. A method for carrying out an endothermic reaction for obtaining a product gas from a feed gas, comprising feeding a feed gas into a reactor comprising:
a pressure jacket;
an inlet for solid particles and an outlet for said product gas on an upper end of said reactor; and
an outlet for solid particles and an inlet for said feed gas on a lower end of said reactor,
and which comprises a gravity-driven moving bed in a reaction zone of the reactor interior, which gravity-driven moving bed comprises a plurality of solid material particles, wherein the reactor is also configured to guide the feed gas into the reaction zone, wherein, in order to heat the feed gas, the reactor is configured to heat the solid material particles in the reaction zone by generating an electric current in the solid material particles between a pair of first and second electrodes which are permeable to the solid material particles, the feed gas and the product gas in each case such that, by transferring heat from the solid material particles to the feed gas, the feed gas in the reaction zone can be heated to a reaction temperature in order to react in the endothermic reaction for producing the product gas, and wherein the reactor interior also comprises a first heat integration zone in which heat from the product gas produced in the reaction zone can be transferred to solid material particles of the gravity driven moving bed which are to be guided into the reaction zone, and wherein the reactor interior also comprises a second heat integration zone in which heat from solid material particles of the gravity driven moving bed coming from the reaction zone can be transferred to the feed gas in order to preheat the feed gas, wherein said reaction zone is arranged between said pair of first and second electrodes and said first heat integration zone is arranged above said first electrode, said second heat integration zone is arranged below said second electrode and said first electrode is arranged above said second electrode, wherein said outlet for solid particles comprises a control element for the speed of travel or the mass flow of the moving bed which is configured to control a speed of travel of a mass flow of said gravity driven moving bed to be within a range of 0.1 to 2 m/h, wherein a plurality of solid material particles is guided into the first heat integration zone and from there into the reaction zone, the solid material particles are heated in the reaction zone, the solid material particles are guided from the reaction zone into the second heat integration zone and withdrawing said solid material particles from the second heat integration zone at a rate such that the speed of travel of said gravity driven moving bed is within the range of 0.1 to 2 m/h, the feed gas is introduced into the second heat integration zone and from there into the reaction zone, wherein the feed gas in the second heat integration zone is heated against solid material particles coming from the reaction zone, wherein the solid material particles are cooled, and wherein the feed gas is contacted with the heated solid material particles in the reaction zone, wherein heat from the heated solid material particles is transferred to the feed gas in order to heat the feed gas in the reaction zone, wherein the feed gas in the reaction zone reacts, producing the product gas, the product gas produced is guided from the reaction zone into the first heat integration zone, wherein the solid material particles in the first heat integration zone are preheated against the product gas coming from the reaction zone, wherein the product gas is cooled, the product gas is withdrawn from the first heat integration zone, and a heat capacity flow of the gas and a heat capacity flow of said solid material particles are adapted to each other.

2. The method according to claim 1, wherein the reactor is configured to provide a direct voltage or an alternating voltage between said pair of first and second electrodes for heating the solid material particles.

3. The method according to claim 1, wherein said inlet for solid particles is configured to allow solid material particles to be introduced into the first heat integration zone such that the solid material particles can be guided past the first electrode into the reaction zone and also guided past the second electrode into the second heat integration zone.

4. The method according to claim 1, wherein the reaction zone of the reactor is delimited by a circumferential wall section of the reactor, which has an inner side facing the reaction zone and is of conical design such that the reaction zone tapers upward in a vertical direction.

5. The method according to claim 4, wherein the inner side forms an angle with a horizontal cross-section of the reaction zone, wherein the angle is in a range from 85° to 89.5°.

6. The method according to claim 4, wherein the inner side forms an angle with a horizontal cross-section of the reaction zone, wherein the angle is in a range from 87° to 89°.

7. The method according to claim 1, wherein said pair of first and second electrodes and said gravity-driven moving bed are electrically insulated toward said pressure jacket.

8. The method according to claim 1, wherein said pair of first and second electrodes are arranged or configured in such a way that flowability of said solid material particles is not impaired and said solid material particles, said feed gas and said product gas can pass through said pair of first and second electrodes in said reactor interior.

9. The method according to claim 1, wherein said reactor is comprised of a single pair of first and second electrodes.

10. The method according to claim 1, wherein said endothermic reaction for obtaining a product gas from a feed gas is steam reformation of a hydrocarbon-containing feed gas stream or is the cracking or thermal cracking of ethane or is the pyrolysis of natural gas.

11. The method according to claim 1, wherein said endothermic reaction for obtaining a product gas from a feed gas is selected from the group consisting of (i) ethane and steam reacting to ethene and hydrogen, (ii) methane and steam reacting to carbon monoxide and hydrogen, (iii) propane reacting to propene and hydrogen, (iv) butane reacting to butene and hydrogen, (v) ethylbenzene reacting to styrene and hydrogen, and (vi) methane reacting to hydrogen and carbon.

12. The method according to claim 1, wherein said control element is a mechanical control element.

13. The method according to claim 1, wherein said control element is a cellular wheel.

14. The method according to claim 1, wherein carbon deposits onto said plurality of solid material particles.

15. The method according to claim 1, wherein at least 90% of heat used is recovered.

* * * * *